A. MILLS.
VEHICLE WHEEL.
APPLICATION FILED JAN. 18, 1919.
1,350,617.
Patented Aug. 24, 1920.
2 SHEETS—SHEET 1.
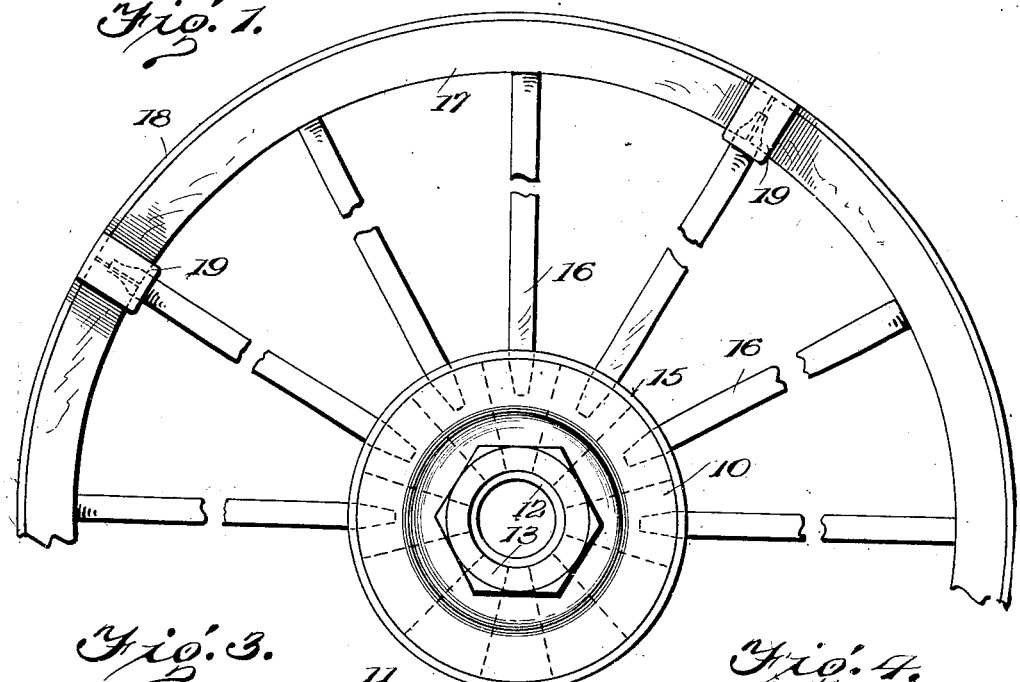
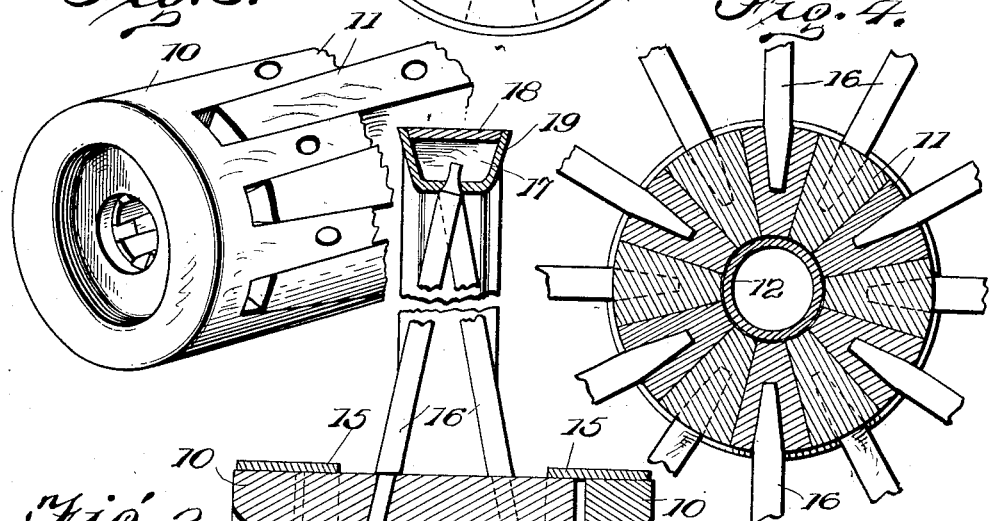
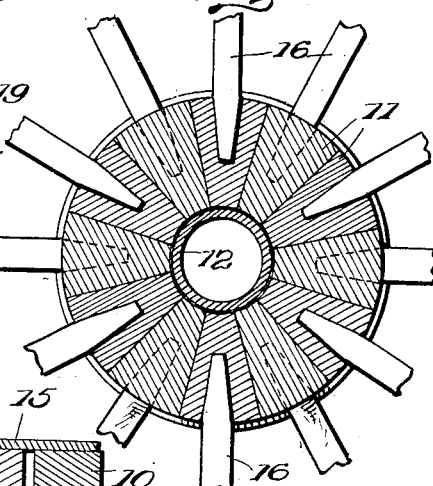
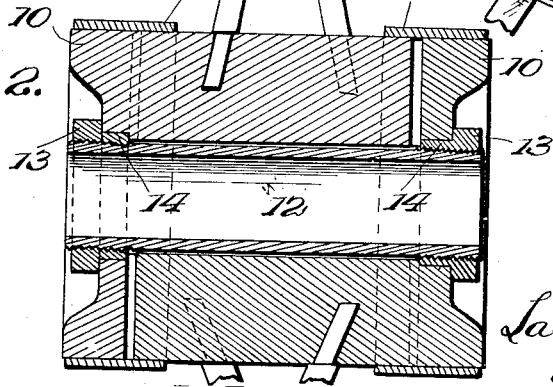
Inventor.
A. Mills.
Lacey & Lacey.
Attorneys.

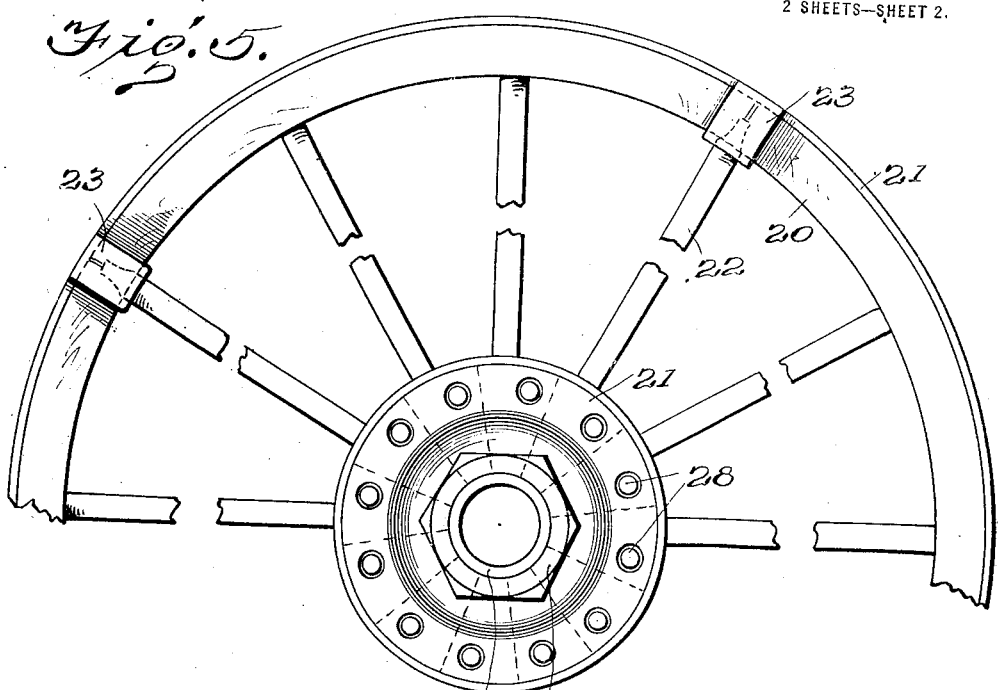
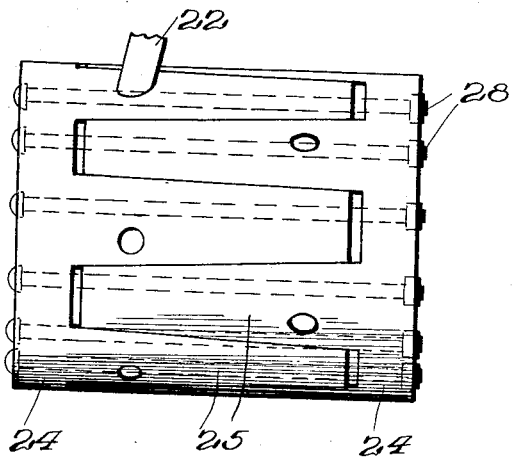 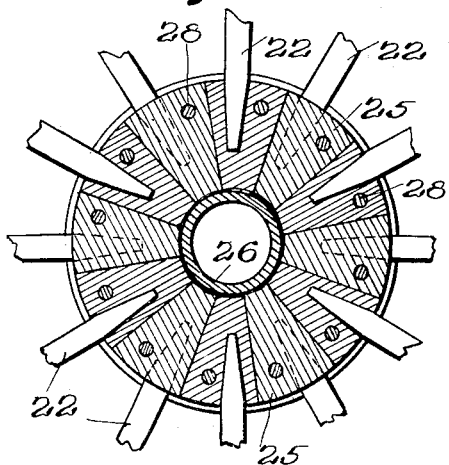

UNITED STATES PATENT OFFICE.

ARTHUR MILLS, OF SACRAMENTO, CALIFORNIA.

VEHICLE-WHEEL.

1,350,617. Specification of Letters Patent. Patented Aug. 24, 1920.

Application filed January 18, 1919. Serial No. 271,893.

*To all whom it may concern:*

Be it known that I, ARTHUR MILLS, citizen of the United States, residing at Sacramento, in the county of Sacramento and State of California, have invented certain new and useful Improvements in Vehicle-Wheels, of which the following is a specification.

This invention relates to an improved vehicle wheel and has as its primary object to provide a construction wherein the wheel felly may be adjustably expanded to engage the rim so that the rim may, at all times, be firmly held upon the wheel.

The invention has as a further object to provide a wheel employing a sectional hub and wherein the sections of the hub will be adjustably connected so that said hub sections may be shifted inwardly upon each other for straightening the position of the wheel spokes with respect to the hub and felly and consequently expanding the felly against the rim as well as binding the spokes between the hub and felly.

And a further object of the invention is to provide a construction wherein the sections of the hub will, when shifted inwardly, wedge upon each other to thus interlock so as to overcome any looseness between the hub sections.

Other and incidental objects will appear during the course of the detailed description of the invention. In the drawings, wherein I have illustrated the preferred embodiment of the invention, and wherein similar reference characters designate corresponding parts throughout the several views:

Figure 1 is a fragmentary side elevation showing a wheel constructed in accordance with my invention, Fig. 2 is a fragmentary vertical sectional view more particularly illustrating the manner in which the sections of the hub of the wheel are connected, Fig. 3 is a fragmentary perspective view showing the hub in detail, Fig. 4 is a transverse sectional view taken through the hub, Fig. 5 is a fragmentary side elevation showing a modified form of wheel hub.

Fig. 6 is an elevation showing the modified hub in detail, and

Fig. 7 is a fragmentary transverse sectional view taken through the modified form of hub.

In carrying the invention into effect, I employ a wheel hub which is formed of mating sections 10. This hub may be constructed of wood or, if preferred, may be of metal and formed on the sections are interdigitated wedge shaped tenons 11. These tenons are so constructed that, as the sections approach the limit of their inward movement, the tenons will wedge against each other to thus lock the sections of the hub together while, at the same time, any looseness between the sections will be overcome. The wedging action of the tenons will, of course, gradually increase as the tenons approach the limit of their inward movement upon each other. Freely fitted through the hub is a tubular boxing 12 threaded at its ends to receive clamping nuts 13 countersunk in the outer ends of the hub and connecting the sections thereof. These nuts are, as particularly shown in Fig. 2, provided with centering flanges 14 snugly fitting within suitable channels at the outer ends of the hub sections and centering the boxing with respect to the hub, the channels being accurately formed in concentric relation to the axis of the hub. As will be clear, the nuts 13 may be adjusted for shifting the hub sections inwardly upon each other and in this connection it will be noted, as also particularly shown in Fig. 2, that in the normal position of the sections, the tenons of the sections do not overlap their full length. Snugly surrounding the ends of the hub are hub bands 15 which serve to close the openings defined at the ends of the hub tenons and reinforce the hub as well as prevent outward warping or displacement of said tenons.

Connected at their inner ends with the hub sections 10 are spokes 16. These spokes are staggered with respect to each other, alternate spokes being engaged with the tenons of one of the sections and the intermediate spokes being engaged with the tenons of the other section. As particularly shown in Figs. 3 and 4, the tenons are, adjacent their inner ends, provided with sockets and the spokes are at their inner ends provided with reduced tenons engaging these sockets. Surrounding the spokes at their outer ends is a felly 17 which is formed of a plurality of segments or sections, four such sections being preferably employed. At their inner sides the sections are provided with sockets and, as shown in Fig. 2, the spokes are formed at their outer ends with tenons engaging in these sockets, it being observed in this connection, as particularly illustrated in Fig. 1, that the junctions between the sections lie, in each instance, directly over a spoke. Surrounding the felly is a rim 18 and holding this rim against lateral displacement are felly clips 19. These clips are substantially U-shaped in cross section and are fitted over the wheel spokes at the junctions of the sections of the wheel felly to embrace said sections at their ends and project at opposite edges of the rim. The clips will thus not only hold the rim against lateral shifting but will serve to prevent lateral displacement of the ends of the felly sections and accordingly maintain said sections in alinement.

As will now be clear, the wheel may be assembled by first connecting the spokes with the sections of the hub when the sections of the felly may be engaged with the outer ends of the spokes and the rim applied. Then, by adjusting the nuts 13 upon the boxing 12 of the hub, the hub sections may be shifted inwardly upon each other for locking the tenons of the hub sections in wedging engagement with each other. Coincidently, the inner ends of the spokes will be moved toward an alined position so that the spokes will be straightened somewhat in their position with respect to the hub and felly. As will be clear, this straightening of the spokes will act to expand the felly sections into binding engagement with the rim so that the rim will thus be firmly held upon the felly. It will thus be seen that I provide a highly practical type of wheel, since, as will be appreciated, any looseness occurring between the spokes and the hub, the spokes and the felly, or between the rim and felly, may be readily taken up by simply adjusting the clamping nuts 13 upon the hub boxing to draw the sections of the hub inwardly upon each other.

In Figs. 5, 6 and 7 of the drawings, I have shown a wheel embodying the salient features of the preferred construction but employing a slightly modified form of hub. In these figures, the wheel felly is indicated at 20, the rim at 21 and the spokes at 22. All of these parts are constructed according to the preferred form of the invention, the felly being formed of sections and the spokes at the junction of the sections carrying clips 23 corresponding to the clips 19. Supporting the spokes at their inner ends is a hub which is formed of mating sections 24 provided with digitated wedge shaped tenons 25 corresponding to the tenons 11 of the hub of the preferred form of wheel and coacting in a similar manner. Extending through the hub axially thereof is a boxing 26 corresponding to the boxing 12 of the preferred construction and carrying at its ends clamping nuts 27 corresponding to the clamping nuts 13. In this modified form of hub, reinforcing rods 28 are employed, these rods extending longitudinally through the tenons 25 in the manner particularly shown in Fig. 7. At corresponding ends thereof the rods are headed to engage the outer end of one of the hub sections while nuts are threaded upon the opposite ends of said rods to confront the outer end of the other hub section and are adjustable for drawing the hub sections together. As will be seen, these rods will support the hub sections with respect to each other and will relieve the hub boxing and clamping nuts 27 of the major portion of the strain. Owing to the presence of the reinforcing rods within the tenons 25, the sockets for the inner ends of the spokes are, as particularly shown in Fig. 6, located adjacent corresponding side faces of the tenons.

Having thus described the invention, what is claimed as new is:

1. A vehicle wheel including a hub formed of sections shiftable inwardly upon each other, spokes carried by the hub sections respectively, a felly supported by the spokes, a boxing extending through the hub, means adjustable upon the boxing for shifting the hub sections inwardly upon each other to expand the felly, and means carried by said first mentioned means and coacting with the hub sections for centering the boxing with respect to the hub.

2. A vehicle wheel including a sectional hub, spokes carried by the hub sections respectively, a felly supported by the spokes, a boxing extending through the hub and connecting the sections thereof, and means carried by the end portions of the boxing and coacting with the hub sections for centering the boxing with respect to the hub.

3. A vehicle wheel including a sectional hub, spokes carried by the hub sections respectively, a felly supported by the spokes, a boxing extending through the hub, and nuts carried by the end portions of said boxing and provided with shoulders coacting with the hub sections for centering the boxing with respect to the hub.

4. In a vehicle wheel, the combination of a sectional hub provided with mating tenons, spokes carried by the hub sections respectively, a felly supported by the spokes, and means extending through each of said tenons eccentrically of the hub for connecting the hub sections and bracing the tenons longitudinally.

5. In a vehicle wheel, the combination of a sectional hub provided with mating tenons, spokes carried by the hub sections respectively, a felly supported by the spokes, and a rod extending through each of said tenons eccentrically of the hub for connecting the hub sections and bracing the tenons longitudinally.

In testimony whereof I affix my signature.

ARTHUR MILLS. [L. S.]